March 11, 1941.　　　C. C. GULDBECH　　　2,234,526
METHOD FOR TWISTING DOUGH
Original Filed May 3, 1940　　　2 Sheets-Sheet 1
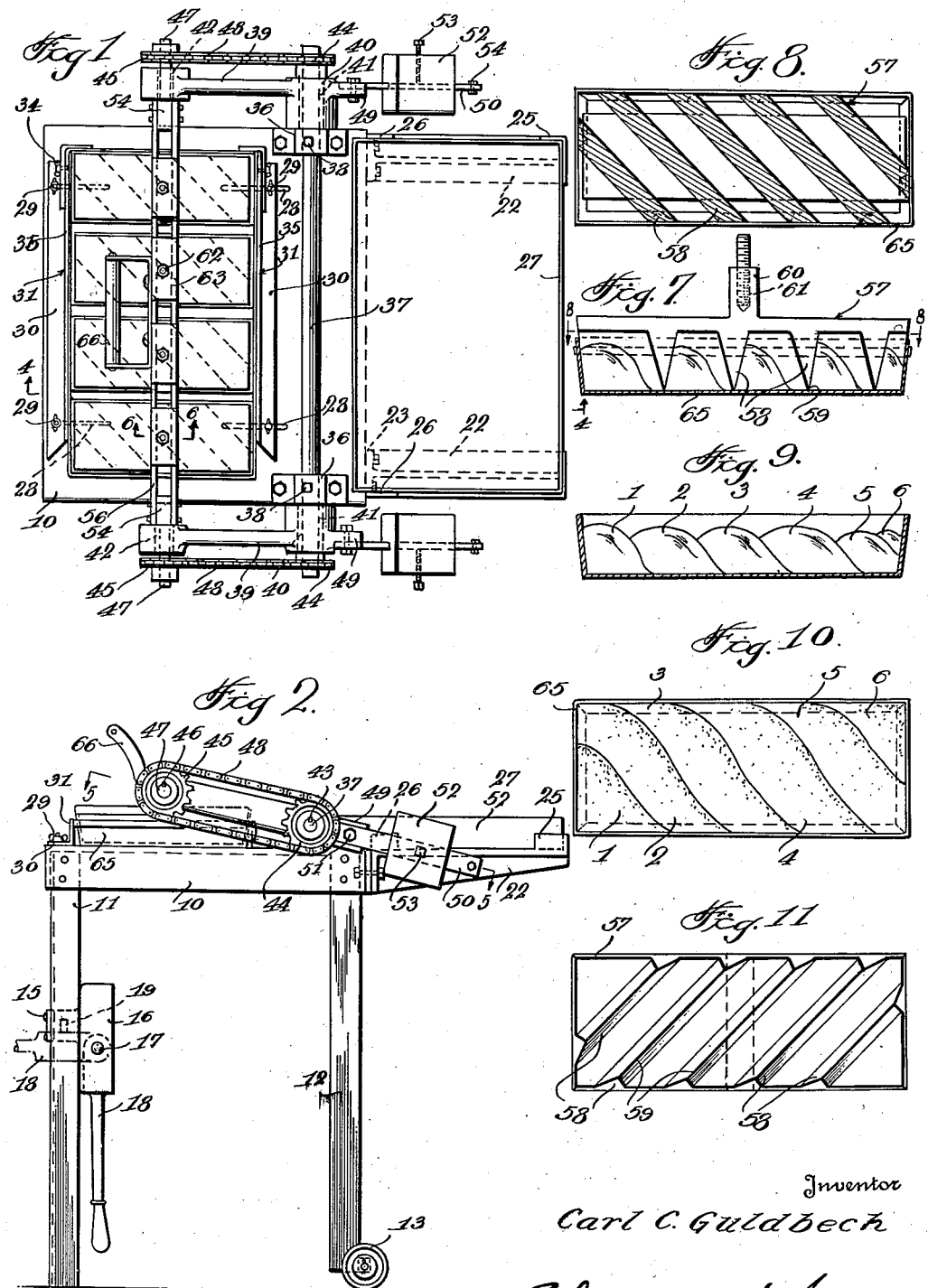
Inventor
Carl C. Guldbech
By Christian R. Nielsen
Attorney March 11, 1941. C. C. GULDBECH 2,234,526
METHOD FOR TWISTING DOUGH
Original Filed May 3, 1940 2 Sheets-Sheet 2
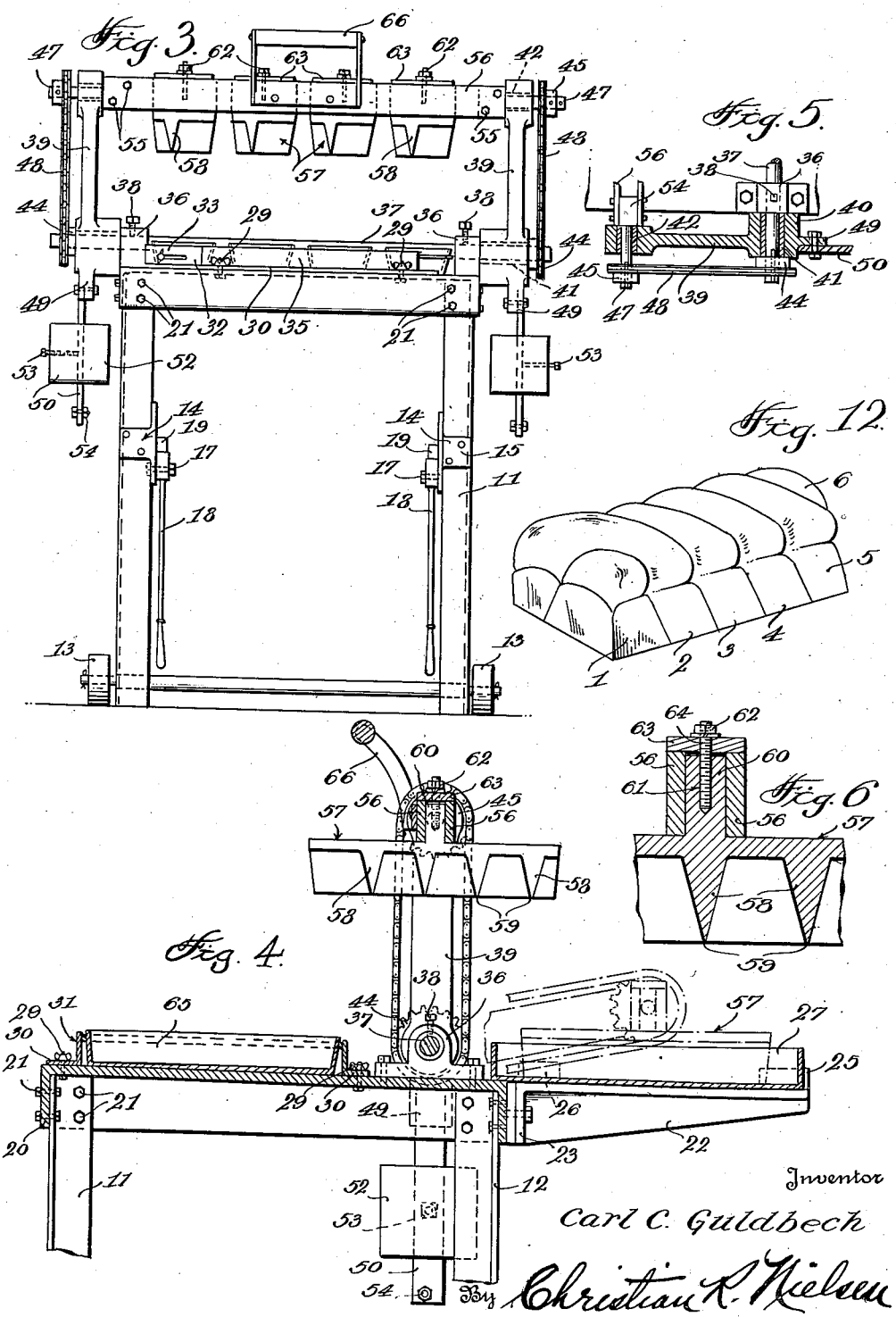
Inventor
Carl C. Guldbech
By Christian R. Nielsen
Attorney Patented Mar. 11, 1941

2,234,526

UNITED STATES PATENT OFFICE 2,234,526

METHOD FOR TWISTING DOUGH

Carl C. Guldbech, New York, N. Y.

Original application May 3, 1940, Serial No. 333,224. Divided and this application September 13, 1940, Serial No. 356,696

7 Claims. (Cl. 107—54)

This application is a division of my application filed May 3, 1940, Serial Number 333,224, and relates to a method for twisting dough, and more particularly to a method in which the dough itself effects the action, after depositing and severing of the dough in the baking pans.

It is a cardinal object of the invention to provide a novel and simple method of forming twisted dough by cutting the dough into a desired number of segments, while in the pan, and allowing the twisting action of the dough, due to molecular and fiber displacement of the dough during proofing to effect the twist to the dough.

Heretofore twisted bread has been formed either by manually or mechanically twisting the dough before baking, a practice which has been found to be expensive as well as failing to produce bread of uniform texture.

In order to overcome the above, as well as other difficulties, I have conceived and put into actual practice, a method and means for twisting formed dough by employing the molecular changes of severed dough, during proofing, to effect the twisting of the dough.

One example of machine for preparing the dough in order to carry out the method is shown in the accompanying drawings, wherein Figure 1 is a top plan view of my machine.

Figure 2 is a side elevation thereof.

Figure 3 is a front view thereof.

Figure 4 is an enlarged cross section on the line 4—4 of Figure 1.

Figure 5 is a longitudinal section on the line 5—5 of Figure 2, illustrating the means for controlling the operation of the die members.

Figure 6 is an enlarged fragmentary cross section illustrating the die mounting and assembly means taken on the line 6—6 of Figure 1.

Figure 7 is a side elevation of a die within a pan illustrating the cutting operation of the dough.

Figure 8 is a sectional view on the line 8—8 of Figure 7.

Figure 9 is a sectional view of a pan with the severed dough therein.

Figure 10 is a top plan view of the dough, illustrating approximately the twist of the dough after steam proofing.

Figure 11 is a bottom plan view of one of the die members.

Figure 12 is a perspective view of a loaf of bread formed and baked in accordance with the present machine and method.

A preferred machine for carrying out the method is disclosed in the accompanying drawings wherein there is shown a rectangular member 10 supported upon upright legs 11 and 12, there being an upright at each corner of the frame. The uprights 11 will be defined as the front legs while the ones 12 will be considered the rear legs, and these latter legs will be provided with rollers 13 for ready transport of the machine as will be described hereinafter.

Intermediate the height of the front legs 11 a casting 14 is bolted or otherwise secured, comprising an angle plate 15 adapted to snugly fit upon the leg for securement thereto with which there is integrally formed a body portion 16, the latter being preferably disposed upon the inner side of the legs so as to avoid undesirable projecting portions, and has an ample length so as to have a substantial contacting area with the leg. A pivot bolt 17 is mounted in the body 16 at a point below the plate 15 and swingably fixed to the bolt there is a handle 18. A stop lug 19 is integrally formed upon each of the body members 16 arranged in the path of upward swinging movement of the handles 18, the lugs 19 being vertically positioned so as to limit the upward movement of the handles when they reach a horizontal position with respect to the legs 11. It will thus be seen that the machine may be readily transported by merely tilting the front end of the machine so as to place the load on the rollers 13. Upon release of the handles 18 they will fall to the inoperative position as shown in Figure 2.

The base member 10 is shown as an inverted boxing, the flanges 20 of which afford means for rigidly securing the legs 11 and 12 by bolts 21.

Upon the flange 20 at the rear of the base 10 a pair of brackets 22 are fixed, this being accomplished in the provision of flanges 23 complemental to the flange 20 and bolts 24 threadedly engaged in tapped holes in the flanges 20.

The brackets 22 are spaced longitudinally apart approximately the width of the machine and at the projecting ends thereof upstanding angular flanges 25 are formed. Upstanding flanges 26 are provided on each of the brackets at the points of attachment to the base 10, extending longitudinally of the brackets and aligned with an edge of the angle flange 25. The flanges 25 and 26 form means for centering and maintaining a dusting pan 27 against movements when placed upon the brackets, for a purpose as will appear as the description proceeds.

The base 10 has a pair of slots 28 inwardly of each end thereof through which a lock bolt 29 is mounted, the bolt passing through an aperture formed in the flange 30 of a pan guide 31. The slots 28 extend parallel to respective ends of the base, and it will therefore be apparent that guides 31 will be adjusted longitudinally along the slots to accommodate different lengths of bake pans. In order to accommodate pans of differing widths, there is provided an adjustable end wall 32. The wall is of angular formation, one leg of which is slotted as at 33, and receives a lock bolt 34 therethrough, the bolt being carried by the vertical wall 35 of the pan guide 31. The other leg of the angle 32 is extended inwardly in the path of movement of pans to be placed on the base, thus functioning to stop and center the pans as is required.

Upon the base 10, inwardly of its rear edge there is mounted a pair of aligned bearings 36, through which a shaft 37 is extended and fixedly secured against rotation, by means of lock bolts 38. The shaft 37 projects from the bearings 34, and swingably mount respective arms 39. The arms comprise a hub 40 within which a wood bushing 41 is seated, the bushing being impregnated with a lubricant. The free end of the arms 39 are also provided with a bushed bearing 42 similarly impregnated. By impregnating the bearings, the need for grease cups or other lubricating means is avoided, thereby eliminating contamination of dough when being worked upon.

Each end of the shaft 37 has keyed thereon, as at 43, a small sprocket 44, and a similar sprocket 45 is keyed, as at 46, to a stud shaft 47, journalled in the bushings 42 of the arms. A sprocket chain 48 is trained about respective sprockets 44 and 45, for a purpose presently to be explained.

The hubs 40 each have a projecting longitudinally recessed lug 49 receiving a flat rod 50 which is secured therein by means of a bolt 51. A counter-weight 52 is adjustably mounted upon each of the rods 50, and may be secured in adjusted positions by means of a set screw 53. A bolt 54 fixed to the lower end of the rods 50 prevents accidental displacement of the counter-weights.

The stud shafts 47 are integrally formed with a machined body portion 54 of angular formation upon opposed faces of which there are bolted as at 55, respective flat steel bars 56, the bars being extended between and connected to the body portions 54 of respective stud shafts 47, so that the shafts 47 will move in unison upon swinging movement of the arms 39. In addition, the bars 56 function for support of the cutting dies as will now be explained.

Attention is now invited to Figures 6, 7, 8, 9, 10 and 11, for an understanding of the construction of the cutting dies generally indicated at 57. In the present instance, the machine is illustrated as embodying a gang of four cutting dies, but this is not arbitrary, since the number of dies employed depends entirely upon the capacity of the machine. Since the dies are of identical construction, a description of one will be sufficient for an understanding of the construction, attention being directed to Figures 7 and 11.

As shown, the die 57 is of rectangular shape of a size less than the bake-pans with which it cooperates, and since the standard pans have slightly inclined walls, the sides of the die will have similar inclined edge faces and cutting blades 58.

The blades 59 are formed integral with the body portion of the die, and are angularly arranged, spaced longitudinally upon the under face of the body. The blades 58 taper from the body of the die to define a cutting edge 59, and preferably the blades of the die are inclined at such angle that one end of the end blades intersect an end of the body above the longitudinal axis of the body. In the present instance, the die is shown as having five cutting blades, and when such a die is employed in severing a formed roll of dough, six individual pieces of dough result, as indicated by the numerals 1 to 6 in Figures 9 and 10, and therefore the finally baked loaf will show demarkations of the several pieces, as shown in Figure 12.

The die 57 has a transverse extended upstanding lug 60 of a width and machined to fit between the bars 56 (see Fig. 6), and of a height slightly less than the height of the bars 56. The lug 60 is provided with an opening 61 medially of the lug 60 suitably tapped for threaded engagement of a bolt 62.

In order to secure the cutting dies 57 to the bars 56, the lugs 60 are inserted between the bars, a draw plate 63 being positioned above and resting upon the bars, there being one draw plate for each die. Each plate 63 is apertured as at 64, and aligned with the aperture of the lug. It is now only necessary to insert the bolt 62 into the aligned apertures and screw the bolt partly into the tapped aperture 61. The final securement and centering of the cutting dies will now be explained.

It may now be explained that the die members 57 are adapted to be swung from its raised position, as shown in Figure 4, to a position within the bake pans indicated at 65 for effecting the cutting operation, or into the flour dusting pan 27. While no great accuracy is required in placement of the flour pan 27, since the pan may be made sufficiently large to accommodate the dies, adjustment of the dies with respect to the bake pans is essential, in order that the dies may function properly with their respective pans.

Customarily, four pans 65 are considered a unit, and therefore four die members are employed, one for each pan. To obtain proper registration of the dies 57 with the pans, the handle 66 fixed to the outermost bar 56 is grasped and the arms 39 and associated dies 57 are drawn downwardly until the dies are positioned above the open pans 65. Should longitudinal adjustment of the dies be found necessary, the lugs 60 and associated die may be slid in the proper direction so that the die will properly register with its pan 65. It is then only necessary to tighten the bolt 62, which will draw the die snugly against the bars 56 for rigid retention thereof. The mounting and securement of the dies also makes it possible to readily replace the dies when needed, or to install oversize dies for use in cutting other than standard rolls of formed dough. In the latter event, it will also be necessary to adjust the pan guides 31 to accommodate the larger sized pans.

Obviously, it will be necessary that the cutting dies 57 enter the pans 65 at right angles in order to properly sever the formed dough contained therein, and this is accomplished through the gears 44, 45 and chain 48. As has been explained, the shaft 37 is fixed against rotation, and since the gears 44 are keyed thereto, these two elements are held stationary. The sprockets 45 are also fixed to the stud shaft 47 against rotation, but the arms 39 are free to partake of swinging movement upon the shafts 37 and 47. Thus, when the die mechanism is rocked to either side of the vertical position, the links of the chain 48 merely engage successive teeth of the sprockets without effecting rotation of the shafts 37 and 47.

The dies 57 will thus be held to a true course so as to enter the pans 27 and 65 at right angles.

The operation will be substantially as follows: The operator will place a gang of pans 65 upon the base 10, the guides 31 functioning properly to center the pans. Each pan will contain a single piece of formed dough. If the die members 57 have not been previously treated with flour, the operator moves the die mechanism rearwardly, so as to deposit the dies within flour in the pan 27. The counterweight 52 will tend to move the die mechanism to its upper or vertical position, and from this position the die mechanism is swung forwardly and downwardly so that the dies 57 will enter the respective pans. Further pressure upon the handle 66 will cause the blades to cut through the dough as indicated in Figure 7. The handle is then released and the counter-weights 52 will return the die mechanism to its inoperative or vertical position, allowing the operator to remove the pans 65. A new gang of pans and dough may now be placed upon the base for cutting operation, as has been described.

When the pan containing the severed dough is removed from the base, the pans are placed in a steam proofing compartment or room, and it is at this point in the operation that the molecular and fiber displacement of the severed dough occurs.

During the cutting operation, the dough was cut in six individual pieces, each of which has surface adhesion with portions of its pan, i. e., the base, end or side walls, as the case may be. Also, where the incision was made in the dough, a thin skin was formed, sealing gases within each piece, and also, the dough was slightly compressed during the cutting operation. During the proofing of the dough pieces, the gases expand and since the line of least resistance is upwardly in the direction of the incision made by the dies, the gases compacted medially of the dough pieces tend to displace the dough in such direction, and inasmuch as the incisions were made in the dough at an angle to its longitudinal axis, and the further fact that the dough pieces will also partake of an upward rise, a twist will be given each dough-piece, as approximately shown in Figure 10.

The above is applicant's theory of the displacement of the dough during the proofing operation and actual tests have shown that dough so treated and baked provides a bread having a decided twist of a fine texture, free of excessive or large gas cells.

I claim:

1. The method of forming twist bread which comprises forming dough into an elongated mass, positioning the dough in a baking pan, simultaneously severing and slightly compressing the dough into individual pieces, the severance of the dough being at an oblique angle to the longitudinal axis of the dough mass, proofing the dough to obtain a molecular and fiber displacement of the dough in a direction of least resistance, and baking the dough thus formed.

2. The method of forming twist bread which comprises forming dough into an elongated mass, positioning the dough in a baking pan simultaneously severing and slightly compressing the dough into individual pieces, the severance of the dough being at an oblique angle to the longitudinal axis of the dough mass, proofing the dough to obtain a molecular and fiber displacement of the dough in an upward and angular direction with respect to the lines of severance of the dough mass and baking the dough thus formed.

3. The method of treating dough for baking which comprises forming dough into an elongated mass, positioning the dough in a baking pan, cutting the dough into individual pieces along lines at an oblique angle to the longitudinal axis of the dough while in the pan to cause a slight adhesion between the dough pieces and portions of the pan, and proofing the dough to effect a molecular and fiber displacement of each individual piece of dough.

4. The method of forming twist bread which comprises forming dough into an elongated mass, positioning the dough in a baking pan, simultaneously cutting the dough into individual pieces and compacting gases medially of each piece of dough, the severance of the dough being at an oblique angle to the longitudinal axis of the dough mass, proofing the dough to obtain a molecular and fiber displacement of the dough by expansion of the gases confined medially of the dough pieces, and baking the dough thus formed.

5. The method of treating dough for baking which comprises forming dough into an elongated mass, positioning a mass of dough in a baking pan, simultaneously cutting the dough into individual pieces while in the pan to cause a slight adhesion between each dough piece and portions of the pan, the cutting of the dough being made at an oblique angle to the longitudinal axis of the elongated mass of dough, and proofing of the dough to effect a molecular and fiber displacement of each individual piece of dough in the direction of the next adjacent piece of dough.

6. The method of treating dough for baking which comprises forming dough into an elongated mass, positioning an elongated mass of dough in a baking pan, simultaneously cutting the dough into individual pieces while in the pan to cause a slight adhesion between each dough piece and portions of the pan, the cutting of the dough being made at an oblique angle to the longitudinal axis of the elongated mass of dough, and proofing of the dough to effect a molecular and fiber displacement of each individual piece of dough, in an upward and angular direction with respect to the lines of severance of the dough mass and baking the dough this formed.

7. The method of forming twist bread which comprises forming dough into an elongated mass, positioning the dough in a baking pan, severing and slightly compressing the dough into individual pieces, the severance of the dough being at an oblique angle to the longitudinal axis of the dough mass, proofing the dough to obtain a molecular and fiber displacement of the dough in a direction of least resistance, and baking the dough thus formed.

CARL C. GULDBECH.